United States Patent
Aliamiri et al.

(10) Patent No.: US 12,204,506 B1
(45) Date of Patent: Jan. 21, 2025

(54) SYSTEM AND METHODS FOR AUTOMATED STANDARDIZATION OF HETEROGENEOUS DATA USING MACHINE LEARNING

(71) Applicant: American Express Travel Related Services Co., Inc., New York, NY (US)

(72) Inventors: Alireza Aliamiri, New York, NY (US); Himanshu Prabhakar, Livingston, NJ (US); Jack Etheredge, Jersey City, NJ (US); Suprabhat Gurrala, New York, NY (US); Nicholas Andrew Ondo, Brooklyn, NY (US); Katheryn Zhao, New York, NY (US); Rishi Anand, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 424 days.

(21) Appl. No.: 16/850,423

(22) Filed: Apr. 16, 2020

(51) Int. Cl.
| | |
|---|---|
| *G06F 16/215* | (2019.01) |
| *G06N 3/04* | (2023.01) |
| *G06N 3/08* | (2023.01) |
| *G06N 5/01* | (2023.01) |
| *G06N 5/04* | (2023.01) |
| *G06N 20/20* | (2019.01) |

(52) U.S. Cl.
CPC ............ *G06F 16/215* (2019.01); *G06N 3/04* (2013.01); *G06N 3/08* (2013.01); *G06N 5/01* (2023.01); *G06N 5/04* (2013.01); *G06N 20/20* (2019.01)

(58) Field of Classification Search
CPC ........ G06F 16/215; G06N 20/20; G06N 3/04; G06N 3/08; G06N 5/003; G06N 5/04
See application file for complete search history.

(56) References Cited

U.S. PATENT DOCUMENTS

| | | | |
|---|---|---|---|
| 11,450,126 B1 * | 9/2022 | Yu | G06N 3/08 |
| 2019/0065986 A1 * | 2/2019 | Witbrock | G06N 7/01 |
| 2019/0114360 A1 * | 4/2019 | Garg | G06F 16/1794 |
| 2020/0176098 A1 * | 6/2020 | Lucas | G16H 70/00 |
| 2021/0232908 A1 * | 7/2021 | Xian | G06N 3/08 |

* cited by examiner

*Primary Examiner* — Ken Hoang

(57) ABSTRACT

At least some embodiments are directed to a large-scale data standardization system. The system receives a set of documents with records formatted according to a third-party data schema. The system utilizes a first machine learning model to select a document from the set of documents. The system utilizes a machine learning model to select data classification labels formatted according to the third-party data schema. The classification labels are associated with a set of records. The system utilizes a second machine learning model to generate a canonical data structure constructed according to a standardized data schema based on the classification labels and the records associated with the classification labels.

17 Claims, 16 Drawing Sheets

1300 

| |
|---|
| vendor name |
| supplier name |
| name |
| vendor name |
| vendor name |
| name |
| vendor |
| name 1 |
| name1 |
| supplier |
| vendor |
| vendorname |
| vendor_vname |
| name |
| company name |
| suppliername |
| trading partner |
| voucher vendor name |
| vendor name |
| supplier name |
| vendor name |
| payee name |
| vendor name 1 |
| supplier_name |
| merchant name |
| vendor name |
| vndr name |
| pay vendor name |
| carrier name |
| provider name |
| mailing name |
| remit name |
| vendor name1 |
| sup_name |
| system supplier name |
| vendname |
| supplier name |
| supplier name |
| vendor vname |

FIG. 13

| Client Name | Tracking No. | File Type | Record Count | Pre-processor | Post-Processor |
|---|---|---|---|---|---|
| Client A | 100249 | Supplier | 25,956 | 9:54:14 | 10:01:25 |
| Client B | 100248 | Supplier | 2,696 | 9:39:27 | 9:44:59 |
| Client C | 100247 | Other | 11,635 | 10:51:11 | 10:54:33 |

FIG. 14

SYSTEM AND METHODS FOR AUTOMATED STANDARDIZATION OF HETEROGENEOUS DATA USING MACHINE LEARNING

BACKGROUND OF TECHNOLOGY

Data standardization is the critical process of bringing data into a common format that allows downstream data integration, collaborative research, large-scale data analytics, sharing of sophisticated software tools, and execution of complex computational methodologies.

SUMMARY OF DESCRIBED SUBJECT MATTER

In some embodiments, the present disclosure provides a technically improved large-scale data standardization system. The large-scale data standardization system can receive a set of documents, each document of the set of documents can include numerous records constructed from data elements formatted according to third-party data schema.

The large-scale data standardization system can utilize a first machine learning model to select a document from the set of documents based on the records included in such a document. In some implementations, the first machine learning model can be a decision tree. The system can utilize a regression machine learning model, for example, a logistic regression model, to select a set of distinct headers. Finally, a machine learning model such as neural network can be used to classify the selected document using the header and content data. The distinct headers or data classification labels can be associated with a set of records also formatted according to the target data schema. The large-scale data standardization system generates a canonical data structure arranged according to a standardized data schema. The canonical data structure can include the header or classification label and the associated set of records formatted in the standardized data schema.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art one or more illustrative embodiments.

FIGS. 1 to 15 show one or more schematic flow diagrams, certain computer-based architectures, and/or implementations which are illustrative of some examples of aspects of at least some embodiments of the present disclosure.

DETAILED DESCRIPTION

Figure 1:
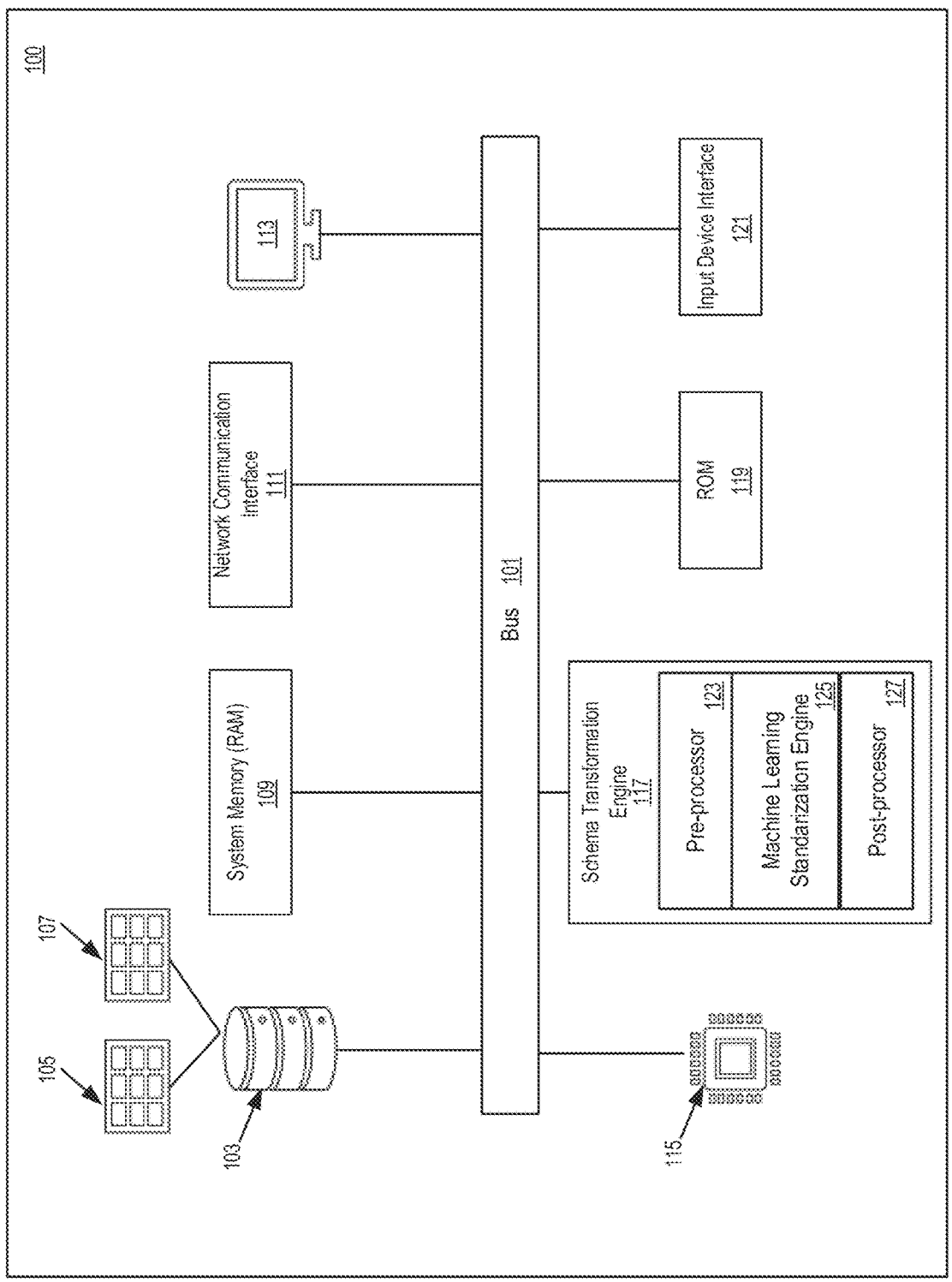

Various detailed embodiments of the present disclosure, taken in conjunction with the accompanying figures, are disclosed herein; however, it is to be understood that the disclosed embodiments are merely illustrative. In addition, each of the examples given about the various embodiments of the present disclosure is intended to be illustrative, and not restrictive.

FIGS. 1 through 15 illustrate computer-based systems and methods for a large-scale data standardization system based on machine learning.

Large-scale data standardization refers to the transformation of source data into a standardized structural representation. Data representing supplier names is a good example, names may be represented in thousands of semi-structured forms or schemas such as "client name" or "vendor name". Standardization systems can parse different components of a supplier name (e.g., vendor name and actual name of vendors) and then rearrange those components into canonical schemas to be compatible and processed by other data services. Drawing 1300 shows example of how supplier name might be presented in the dataset.

Large-scale data standardization systems often rely on heuristics or rule-based computational techniques. Such techniques may execute data transformations guided by heuristics or rules to map data values from source schemas into intended positions and values in target schemas. Standardization systems that rely on heuristics or rule-based computational techniques cannot generalize well unseen data types since it is dreadful to manually encode all different forms of representations manually.

As explained in more detail below, the technical solutions disclosed herein include large-scale data standardization systems that transform data received from multiple data sources. The received data can be constructed based on different types of data schemas. The data standardization system constructs canonical data structures, according to a data schema utilizing one or more machine learning models and machine learning techniques, significantly increasing accuracy and performance of standardization over heuristic methods.

As used herein, the term "data schema" may refer to a structured format to organize and represent digital data in a standardized way.

As used herein, the term "targeted data schema" may refer to a data schema used to construct homogeneous data structures.

As used herein, the term "canonical data structure" may refer to data constructed according to a standardized data schema. Canonical data structures can be constructed based on data included in other data structures generated, for example, by internal and/or different software applications.

As used herein, the term "heterogeneous data structures" may refer to data structures constructed according to different data schemas.

As used herein, the term "homogeneous data structures" may refer to data structures constructed according to a same data schema.

As used herein, the term "document" may refer to data or information recorded in a digital form that can be processed by computer-based systems. Some examples of documents may include text-based documents, spreadsheets, or other suitable document with data or information recorded in a digital form. In some instances, a file may include more than one document, for example, an Excel or Google Sheets file may include multiple work spreadsheets, each work spreadsheet can be considered a document.

As used herein, the term "data classification label" may refer to, for example, a header field that indicates a commonality between a set of records or data elements associated with such data classification label.

The examples described below are provided in the context of large-scale data standardization of heterogenous data structures associated with financial accounting statements including accounts payables (AP) and accounts receivable (AR) provided by software applications issued by different financial institutions. Standardizing such heterogenous data structures can be challenging because there is no universally established way of digitally representing AP and AR statements. For example, enterprises can utilize different schemas depending on the accounting software used by an enterprise. However, it is understood that the technological solutions described herein can equally apply to other heterogeneous data structures used in other contexts or domains.

FIG. 1 illustrates an example of an implementation of a large-scale data standardization system, in accordance with one or more embodiments of the present disclosure. In some embodiments, the large-scale standardization system 100 can include a communication bus 101, a processor 115, a schema transformation engine 117, a system memory 109, a read-only memory (ROM) 119, a database 103, an input device interface 121, an output device interface such as a display 113, and a network communication interface 111.

In some embodiments, the communication bus 101 collectively represents system, peripheral, and/or chipset buses that communicatively connect internal devices of the system 100. The communication bus 101 may be a physical interface for interconnecting the various components. In some embodiments, the communication bus 101 may be a network interface, router, switch, or other communication interface.

In some embodiments, the system 100 may include a processor 115 configured to perform instructions provided via the bus 101 by, e.g., accessing instructions and data stored in memories 109 and 119 via the communication bus 101. In some embodiments, ROM 119 may include a non-volatile storage device, e.g., a magnetic disk hard drive, a solid-state drive, flash memory, or other non-volatile memory and combinations thereof. In some embodiments, system memory 109 may include a volatile memory, e.g., random access memory (RAM) including dynamic RAM and/or static RAM, among other volatile memory devices and combinations thereof. In some embodiments, system memory 109 may store data resulting from processing operations, a cache or buffer of data to be used for processing operations, operation logs, among other data related to the operation of system 100.

In some embodiments, the database 103 can store electronic files, documents, data structure, data records, or other suitable data represented at 105 and 107. In some embodiments, the system 100 may receive, store, or have access to multiple files, documents, data structures, data records, and data stored in the database 103 via the bus 101. Data represented at 107 can be provided by system 100. System 100 can include documents, data records, or other suitable data constructed according to different types of schemas. For example, data represented at 105 and 107 can be produced by third-party systems, different from system 100 and not shown in FIG. 1. System 100 can receive data 105 constructed according to data schemas used by such third-party systems. System 100 can transform data 105 to a standardized data schema represented at 107. Thus, files, documents, data records, data structures, and data stored in database 103 can be constructed according to multiple types of data schemas.

In some embodiments, the schema transformation engine 117 identifies data stored in database 103 constructed according to a third-party schema and transforms such data into a canonical data structure constructed according to a standardized schema. In some implementations, the schema transformation engine 117 can include a pre-processor 123, a machine learning standardization engine 125, and a post-processor 123. The pre-processor 123 can execute multiple operations on data constructed according to third-party data schemas to conform with input requirements of machine learning standardization engine 125. Some examples of operations executed by pre-processor 123 are discussed below with reference to FIG. 6. The machine learning standardization engine 125 can include one or more trained machine learning models and can execute one or more machine learning models to identify data constructed according to third-party schemas and transform such data into a canonical data structure constructed according to a standardized schema. Some examples of operations executed by the machine learning standardization engine 125 are discussed below with reference to FIG. 7, FIG. 8, FIG. 9A and FIG. 9B.

In some embodiments, the post-processor 127 can execute multiple operations on data processed by the machine learning standardization engine 125 to ensure that canonical data structures are generated and stored in the system 100. Some examples of operations executed by the post-processor 127 are discussed below with reference to FIG. 12.

In some embodiments, a user or administrator may interact with the system 100 via a display 113 and a user input device interface 121. The input device interface 121 may include, e.g., a mouse, a keyboard, a touch panel coupled to the display 113 and other suitable input devices. In some implementations, results and statuses related to the system 100 and operations thereof may be displayed to the user via the display 113. For example, in some instances, a user can input a file with multiple documents. Such documents can include data constructed according to different schema types. In response, the system 100 can select data from one or more of the documents included in the file and transform such data into canonical data structures constructed according to a standardized data schema. Such canonical data structures can be presented to the user via the display 113.

As shown in FIG. 1, the communication bus 101 can also couple the system 100 to a network (e.g., network 1507 shown in FIG. 15) through a network communication interface 111. In this manner, the system 100 can be part of a network of computers (for example a local area network ("LAN"), a wide area network ("WAN"), or an Intranet, or a network of networks, for example, the Internet. Thus, the system 100 can receive input data and transmit output data or results to other computing devices via the network communication interface 111.

Figure 2:
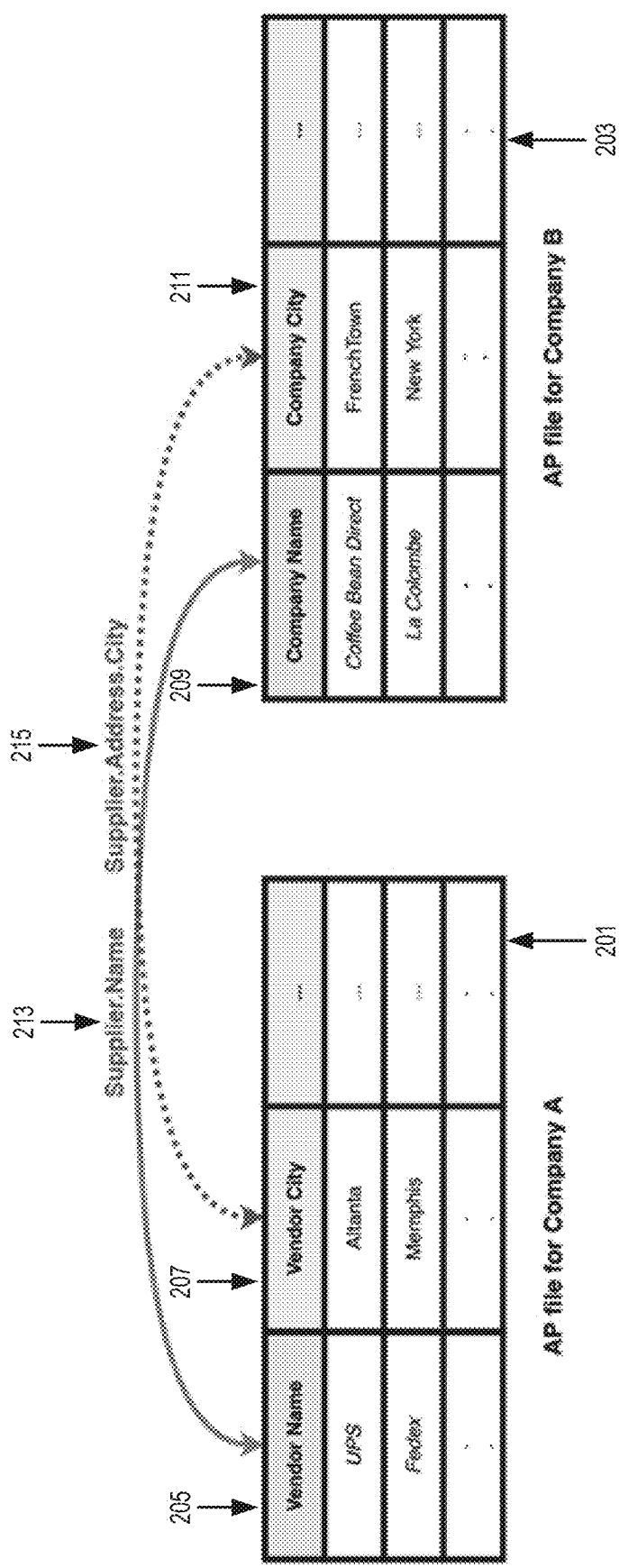

FIG. 2 illustrates an example of heterogeneous data structures constructed according to two different data schemas, in accordance with one or more embodiments of the present disclosure. The data structures 201 and 203 are an example of two corresponding heterogeneous data structures associated with APs. Each of the data structures 201 and 203 are constructed according to two different data schemas. Column 205 in data structure 201 includes a header labeled as "Vendor Name" while column 209 in data structure 203 includes a header labeled as "Company Name." In a targeted data schema, the header labels "Vendor Name" and "Company Name" can correspond to a "Supplier. Name" as shown at 213. Likewise, column 207 in data structure 201 includes a header labeled as "Vendor City" while column 211 in data structure 203 includes a header labeled as "Company City." In a targeted data schema, the header labels "Vendor City" and "Company Name" can correspond to a "Supplier.Address.City" as shown at 215.

Figure 3:
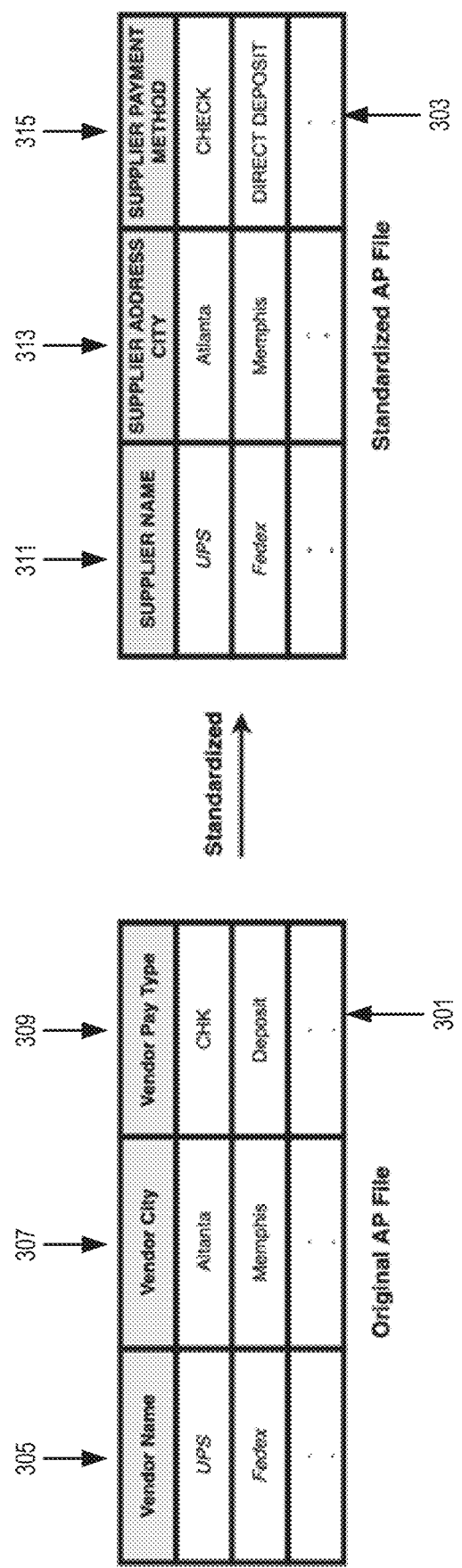

FIG. 3 illustrates an example of a canonical data structure constructed according to a targeted data schema, in accordance with one or more embodiments of the present disclosure. In some embodiments, system 100 can select a data structure 301 constructed according to a type of data schema. For example, column 305 in data structure 301 includes a header labeled "Vendor Name", column 307 includes a header labeled "Vendor City," and column 309 includes a header labeled "Vendor Pay Type." It is noted that under each header of each column there are sets of records associated with that column.

In some embodiments, system 100 can generate, via schema transformation engine 117 (FIG. 1) a canonical data structure constructed according to a standardized data schema as shown at 303. The data structure 303 is a standardized version of the data structure 301. For example, columns 305, 307, and 309 of data structure 301 respectively correspond to column 311, 313, and 315 of the canonical data structure 303. It is understood, that the system 100, can select other data structures different from data structure 301 constructed according to a different type of data schema and likewise generate a canonical data structure constructed according to the standardized data schema utilized at 303. It is also understood, that the system 100, can be configured to generate canonical data structures constructed with different standardized data schemas from the one shown in the canonical data structure 303.

Figure 4:
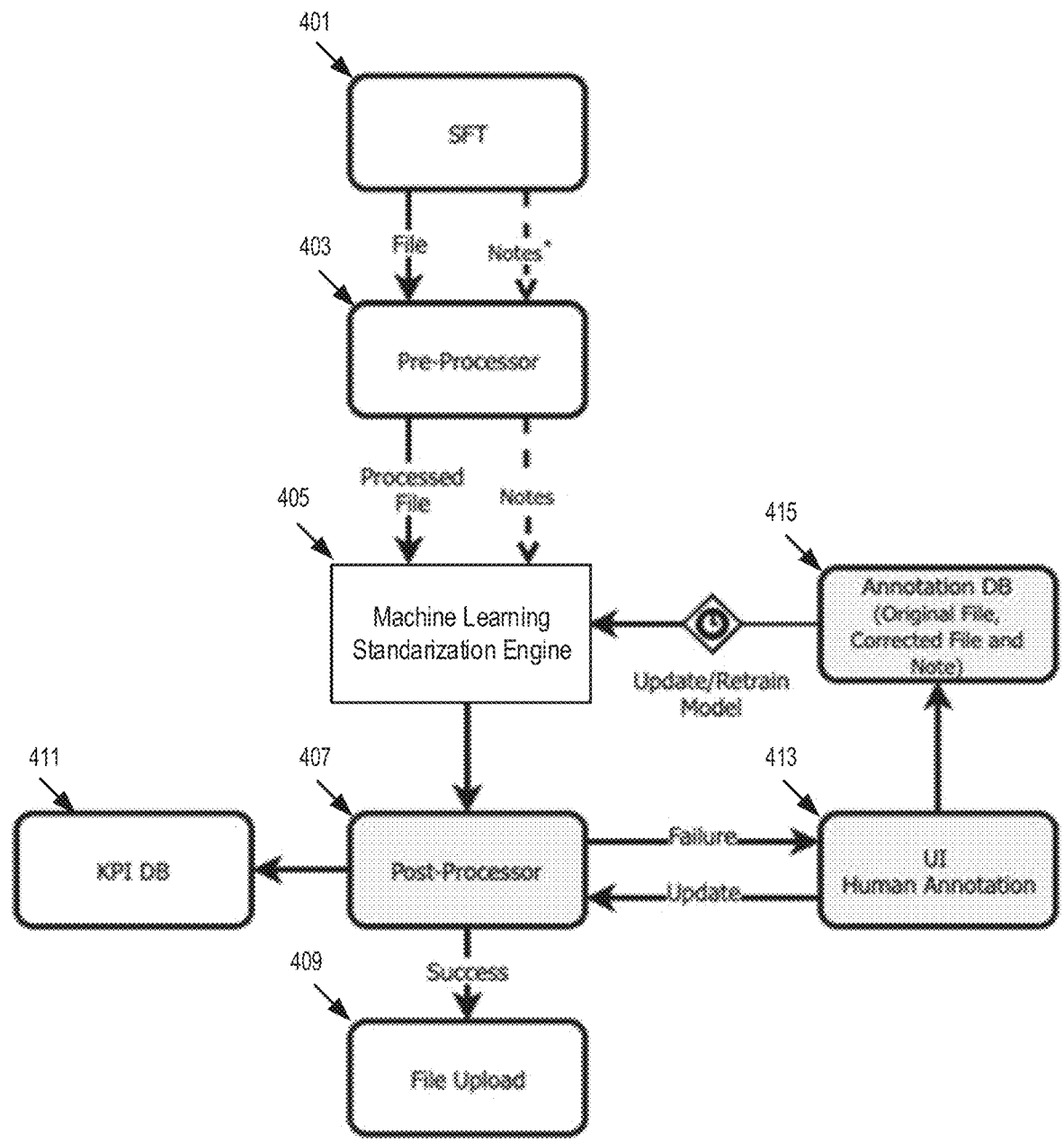

FIG. 4 illustrates an example of a flow chart to generate a canonical data structure constructed according to a standardized data schema, in accordance with one or more embodiments of the present disclosure. In some embodiments, a file or document can be uploaded to a pre-processor at 403 by a software application 401 via, for example, File Transfer Protocol (FTP). Such a file or document can be constructed according to a data schema utilized, for example, by a third-party software application that produced the file or document. It is noted that different software applications may construct data structures according to different data schemas. The system 100 can generate a canonical data structure constructed according to a standardized data schema, irrespective of the data schema used by a third-party software application.

In some embodiments, the pre-processor 403 can sanitize data within the file or document, verify whether the file or document is corrupted, and perform other suitable operations. Operations executed by the pre-processor are further discussed below with reference to FIG. 6. The pre-processed file or document can then be transmitted to the machine learning standardization engine at 405.

In some embodiments, the machine learning standardization engine can generate a canonical data structure constructed according to a standardized data schema based on data included in the file or document as shown at 405. Thereafter, the canonical data structure can be transmitted to the post-processor at 407. The post-processor can verify whether the generated canonical data structure complies with the standardized data schema. Operations executed by the post-processor are further discussed below with reference to FIG. 12.

In some instances, when at the post-processing stage, it is determined that the generated canonical data structure does not comply with the standardized data schema, the file or document can be sent to a user interface for manual annotation as shown at 413. In such a case, a user can correct the system failure by updating or modifying the canonical data structure and transmitting the canonical data structure back to the post-processor. Additionally, or alternatively, the user can correct the system failure, include annotations, and upload the corrected version of the canonical data structure with annotations into a database (e.g., database 103 shown in FIG. 1). In some instances, the corrected and annotated canonical data structure can then be used to retrain or update one or more machine learning models included in the machine learning standardization engine. In some instances, the canonical data structure or other data derived from the generation of the canonical data structure (e.g., success, failure) can be stored in the key performance indicator (KPI) database as shown at 411. In some instances, when the canonical data structure is constructed according to the standardized data schema it can be stored or uploaded into a file as shown at 409.

Figure 5:
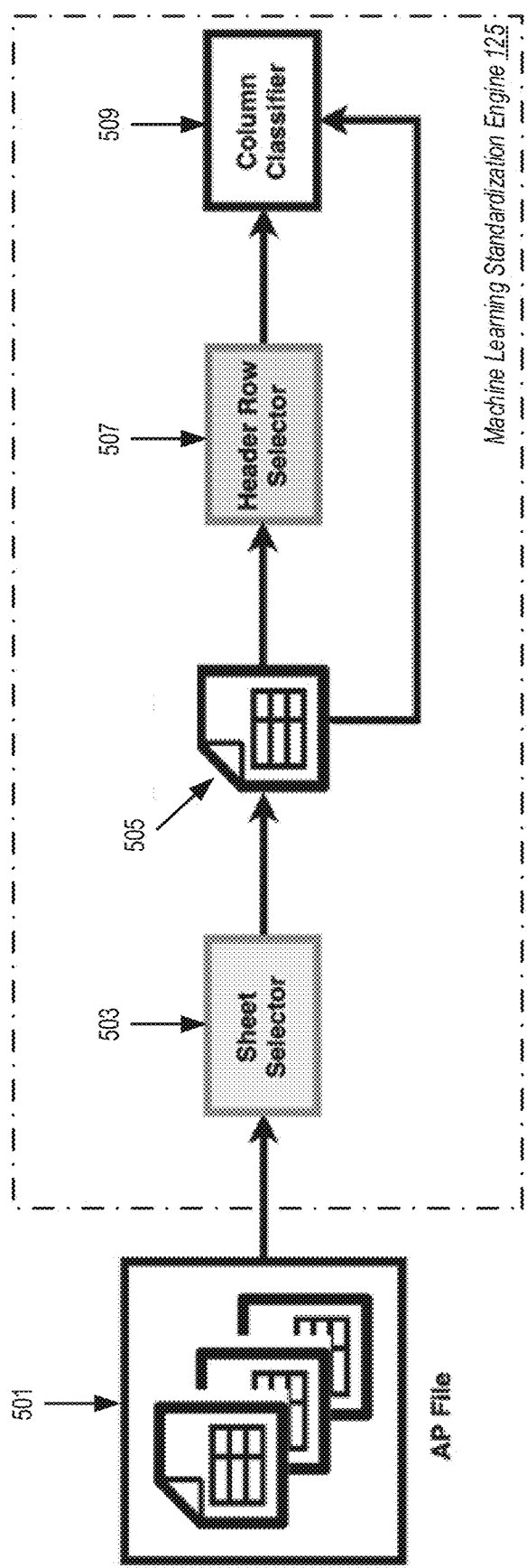

FIG. 5 illustrates an example of a block diagram showing aspects of the machine learning standardization engine 125, in accordance with one or more embodiments of the present disclosure. In some embodiments, the system 100, can receive an AP file 501. The AP file 501 can be constructed according to a data schema associated, for example, with a third-party software application that produced the AP file 501. In this instance, the AP file 501 corresponds to a spreadsheet file (e.g., an Excel file, a Google Sheet file, or other suitable spreadsheet file). The AP file 501 can include one or more work spreadsheets. As discussed above, the AP file 501 can be another file different from a spreadsheet file and can include documents different from work spreadsheets.

In some embodiments the sheet selector 503 can select a work spreadsheet from the AP file 501. Such a work spreadsheet can include data used by the system 100 to generate a canonical data structure constructed according to a standardized data schema than the data schema used by the AP file 501. The sheet selector 503 can be implemented, for example, via a decision tree classifier, a support vector machine, or other suitable type of supervised machine learning model. An example of an implementation of the sheet selector is further discussed below with respect to FIG. 7.

In some embodiments, the output of the sheet selector 503 is a work spreadsheet 505 extracted from the AP file 501. The header row selector 507 selects data elements from the work spreadsheet 505, such data elements can correspond to headers also referred to herein as classification labels. Each header can be associated with a set of records included in the work spreadsheet 505. A header and the associated set of records can form a column data structure.

In some embodiments, the header row selector 507 can use features extracted from the work spreadsheet 505 including number of filled cells in a current row, number of filled cells in previous row, difference between filled cells in a current row from a subsequent or next row, and/or other suitable features. The header row selector 507 can sequentially scan through each row in the work spreadsheet 505 starting at row zero to detect headers using a machine learning model, for example, logistic regression or other suitable regression machine learning model used for classification problems. In some implementations, the header row selector 507 can achieve an accuracy between 90 and 99% in the detection of headers. In some implementations, the header row selector 507 can achieve an accuracy of at least 95% in the detection of headers. In some implementations, the header row selector 507 can achieve an accuracy of at least 96% in the detection of headers. In some implementations, the header row selector 507 can achieve an accuracy of at least 97% in the detection of headers. In some implementations, the header row selector 507 can achieve an accuracy of at least 98% in the detection of headers. In some implementations, the header row selector 507 can achieve an accuracy of at least 99% in the detection of headers.

In some embodiments, headers and their associated set of records can be processed by the column classifier 509. An implementation of the column classifier 509 is discussed below with reference to FIGS. 8, 9A, and 9B. The column classifier 509 generates the canonical data structure constructed according to a standardized data schema different than the data schema used by the AP file 501.

Figure 6:
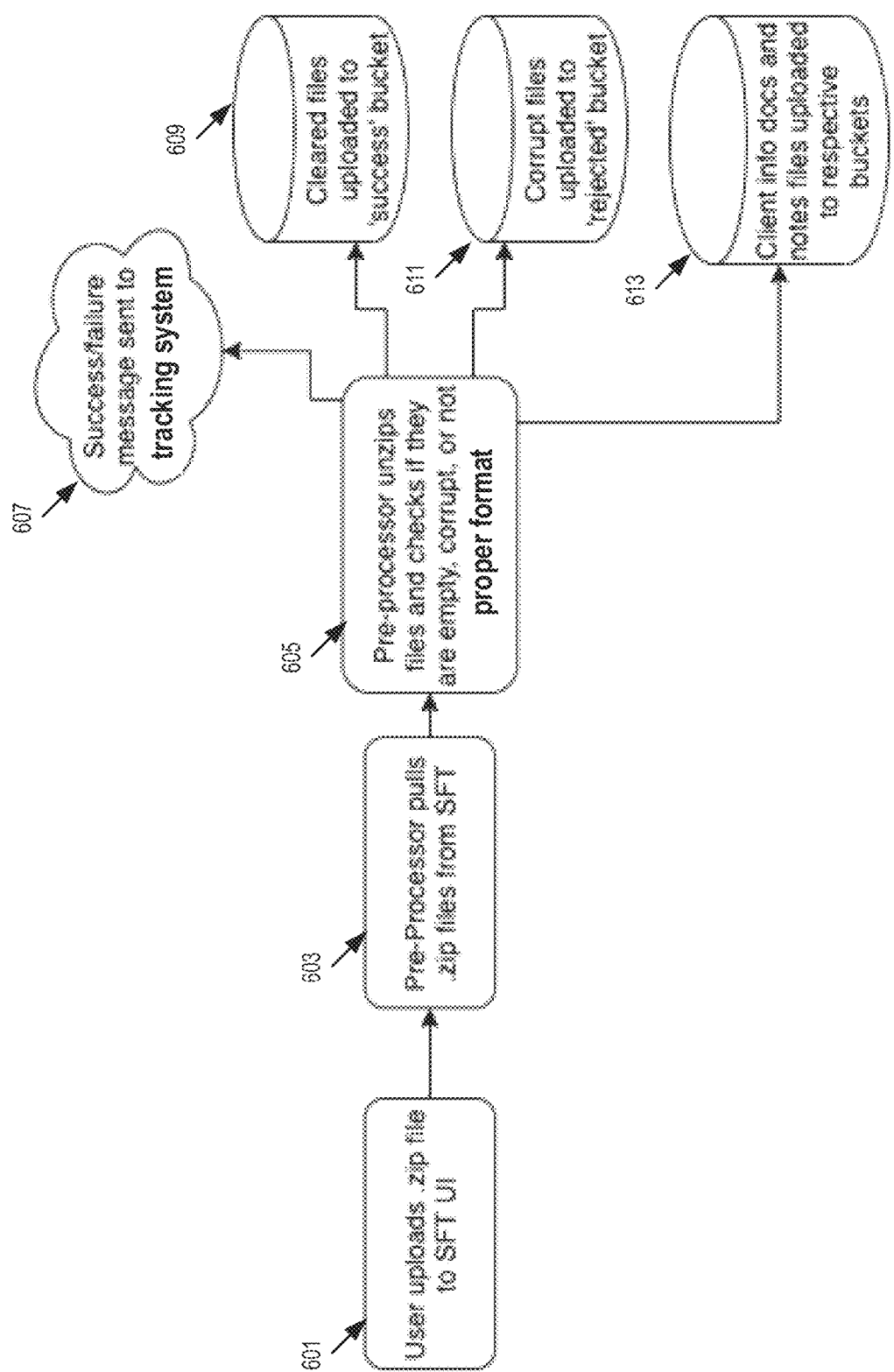

FIG. 6 illustrates an example of computations performed by the pre-processor 123, in accordance with one or more embodiments of the present disclosure. In some embodiments, a user can upload, via a user interface, a compressed file into the system 100, for example, a ZIP file, TAR file, 7z file, or other suitable type of compressed file as shown at 601. Thereafter, pre-processor 123 can receive a compressed file from the user interface as shown at 603.

In some embodiments, the pre-processor 123 can decompress the compressed file to retrieve one or more files or documents from the compressed file and determine whether the decompressed file is empty, whether the files or documents in the decompressed file are corrupted, or whether the files or documents in the decompressed file are not in a proper format (e.g., Excel format, Google sheets format or another proper format) as shown at 605.

In some instances, depending on the outcome of the decompressed file, the post-processor 123 can send a success or failure message to a tracking system at 607. For instance, a success message can be sent to the tracking system at 607 when the decompressed file is not empty and the files or documents in the decompressed file are not corrupted and in a proper format. In some instances, a failure message can be sent to the tracking system at 607 when the decompressed file is empty, or the files or documents retrieved from the decompressed file are corrupted or not in a proper format. The tracking system can be used by, for example, a system administrator to acquire knowledge regarding the state of the input files or documents.

In some instances, when the decompressed file is not empty, and the files or documents in the decompressed file are not corrupt and are in a proper format, the pre-processor 123 can send the files or documents to the database 609 indicating that the files or documents are cleared and ready to be processed by the machine learning standardization engine 125. In some instances, when the decompressed file is empty or the files or documents in the decompressed file are corrupted or not in a proper format, the pre-processor 123 can send the files or documents to the database 611 indicating that the files or documents are, for example, corrupt and may require manual intervention to fixed them. In some instances, when the decompressed file includes files or documents with, for example, client notes or other information not meant to be processed by the machine learning standardization engine 125, the pre-processor 123 can send such file and documents to the database 613 to be paired or associated with files or documents processed by the machine learning standardization engine 125.

Figure 7:
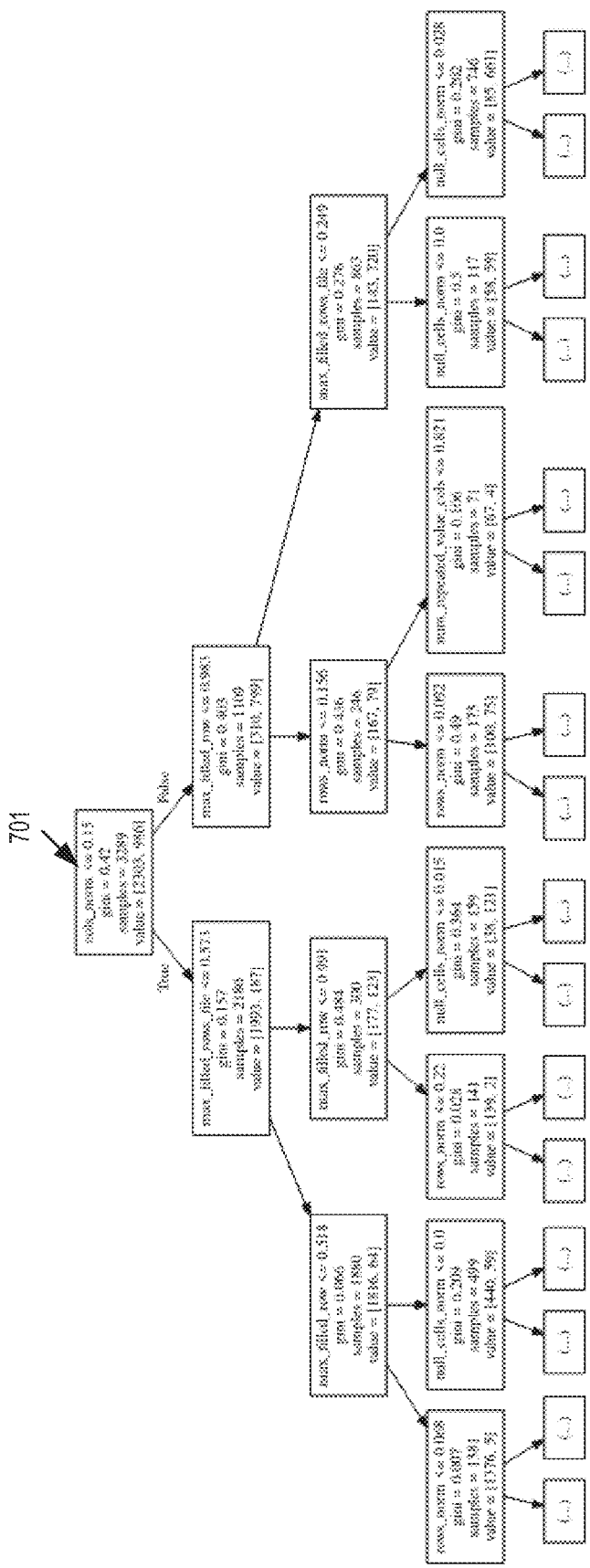

FIG. 7 illustrates an example of an implementation of a sheet selector 503, in accordance with one or more embodiments of the present disclosure. In some embodiments the sheet selector 503 (FIG. 5), can be implemented via a supervised machine learning model. The supervised machine learning model can be implemented, for example, via a decision tree classifier, a support vector machine, or other suitable type of supervised machine learning model.

The machine learning model 701 is an example of the top-level decision branches of a random forests model. Random forests models can be implemented as a combination of tree predictors such that each tree depends on the values of a random vector sampled independently and with the same distribution for all trees in the forest. The generalization error for random forests converges to a limit as the number of trees in the random forest becomes large. The generalization error of a forest of tree classifiers depends on the strength of the individual trees in the forest and the correlation between them. A random selection of features can be used to split each node in a random forests model to yield error rates robust with respect to noise. Internal estimates can monitor error, strength, and correlation, and these estimates can be used to show the response to increase of the number of features used in the node splitting process. Internal estimates can be used to measure the relevancy of features variables.

In some embodiments, the random forests model 701 can be trained with features extracted from work spreadsheets. Such features can include a number of normalized columns, number of normalized rows, number of normalized null cells, number of normalized columns with repeated values, raw number of columns, raw number of rows, largest number of columns of a work spreadsheet in a file, largest number of columns or a work spreadsheet in a file, and/or other suitable features.

In some embodiments, the output of the random forests model 701 can be a work spreadsheet (e.g., work spreadsheet 505 shown at FIG. 5) selected from multiple work spreadsheets or documents inputted into the random forest model 701. Such a work spreadsheet can include data used by the system 100 to generate a canonical data structure constructed according to a standardized data schema different from the data schema of the selected work spreadsheet file.

Figure 8:
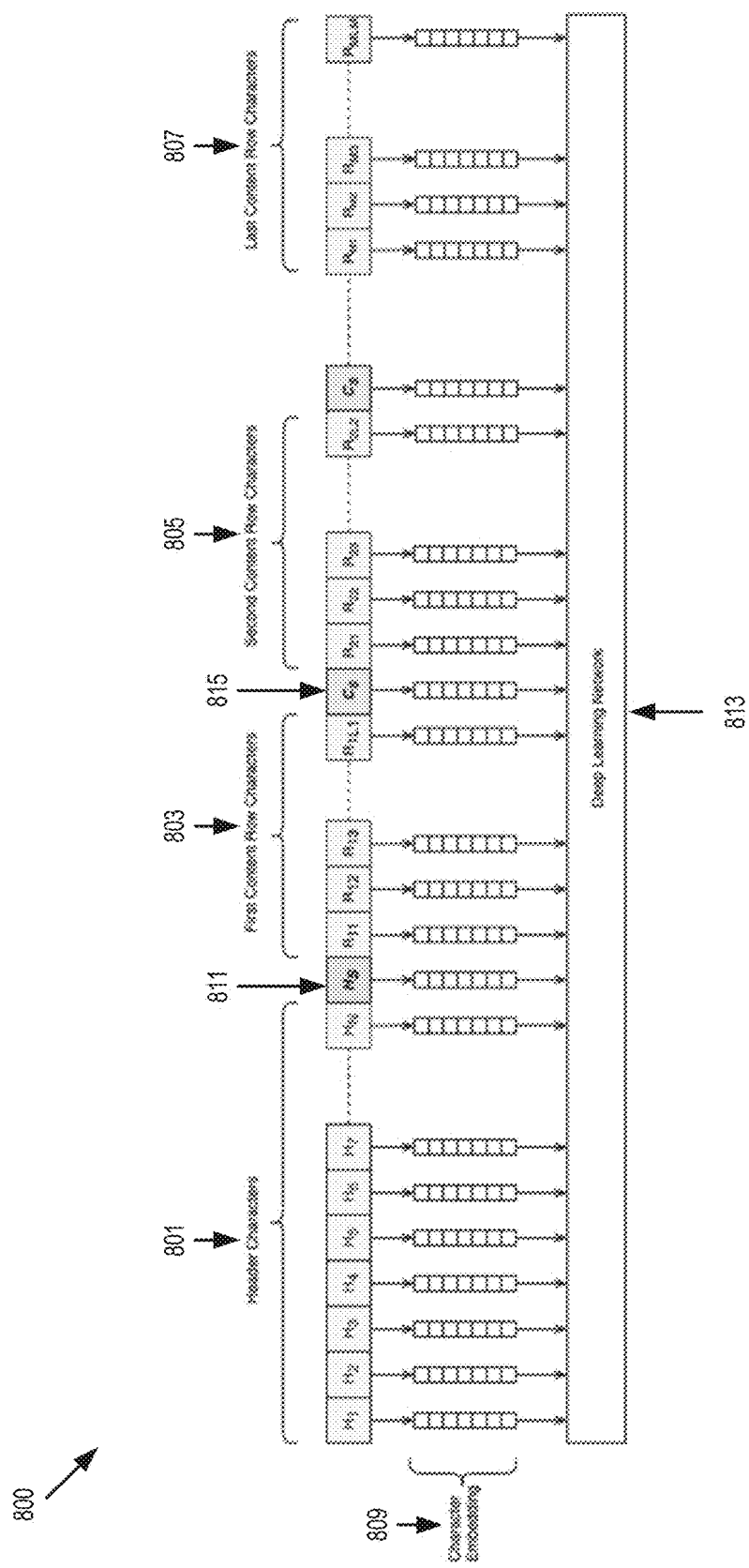

FIG. 8 illustrates aspects of a machine learning model used to generate canonical data structures constructed according to a standardized data schema, in accordance with one or more embodiments of the present disclosure. In some embodiments, a column classification model 800 can receive a data structure with a header and a column with content or data elements (e.g., records content, row content) constructed according to a non-standardized data schema, for example, a header and column content computed from header row selector 507 (FIG. 5).

In some embodiments, the column classification model can be implemented as a machine learning model, e.g., a deep learning network 813. In some implementations, the deep learning network 813 can be a convolutional neural network. The column classification model 800 can generate a header constructed according to a canonical data schema can be generated from the header 801 received by the deep learning network 813. For example, given the header 801 and column contents 803, 805, and 807, a header constructed according a standardized data schema can be formulated as:

$$\text{Column}_{Name} = \text{argmax}_i P_{class_i}(\text{Column}_{class_i} | X_{header}, X_{Contents})$$

where $X_{header}$ is original raw header, $X_{contents}$ is original contents of the column. $P_{class\_i}$ is probability of class i.

Figure 9A:
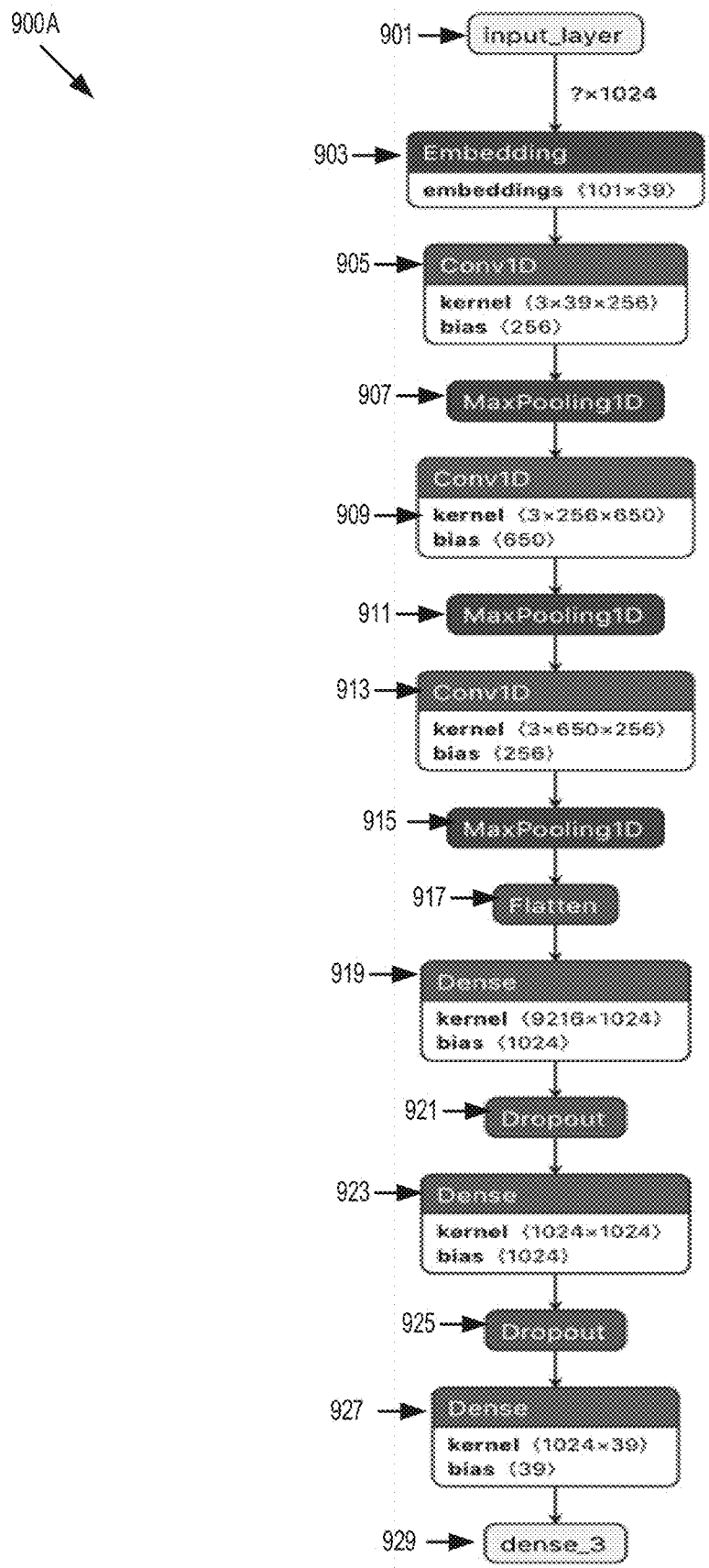
Figure 9B:
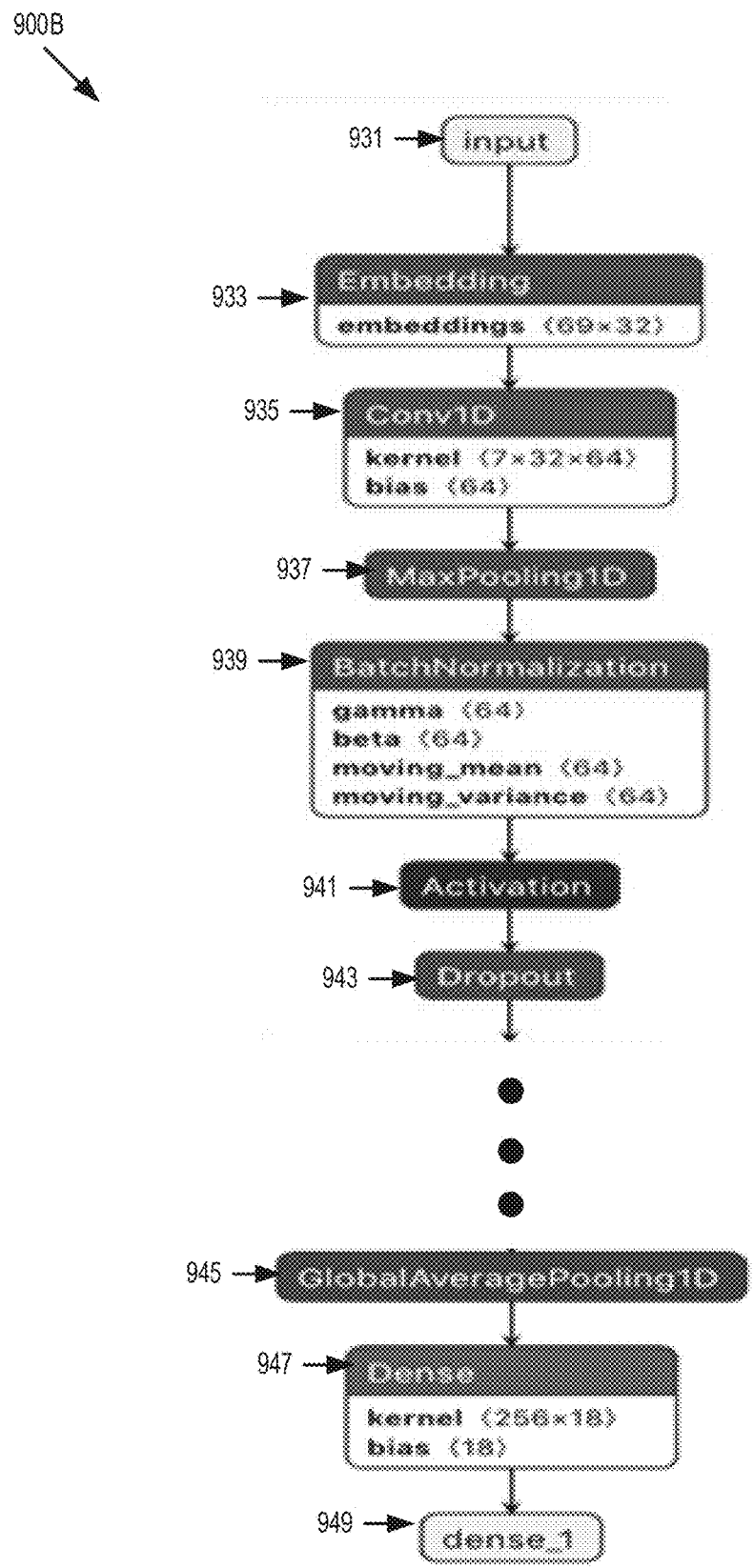

In some embodiments, the deep learning network 813 can be implemented as a character-based convolution neural network further discussed with respect to FIG. 9A and FIG. 9B. The character-based convolutional neural network can use each character of a header 801 and each character of a row or record 803, 805, and 807 as a feature. For example, $H_{i=1 \ldots N}$ can represent the characters of header 801. In some implementations, $H_s$ 811 can represent a header separator character that can be used to indicate an ending of a header and the beginning of the content of a row or record. In some instances, rare or uncommon characters can be used as separators to lower the chance of colliding with actual content. $R_{ij|i=1 \ldots M, j=1 \ldots L_M}$ can represent the characters for content rows or records separated by special $C_S$ characters as shown at 815.

In some embodiments, each character of a header, row or record can be encoded by a vector representing character embeddings as shown at 809. Character embeddings 809 can be generated during the training phase of the deep learning network 813 or can be generated from a pre-trained model used on a larger corpus than the corpus of data structures targeted to be converted into a canonical data schema. In some implementations the character embeddings 809 can be a dimension size ranging from 39 to 64 or other suitable dimension size.

In some embodiments, character embeddings 809 can map to an input alphabet in a K dimensional embedding space. In some implementations, the alphabet size can vary from 68 to 256 and can include letters, numbers, and special characters.

FIG. 9A illustrates an example of a character-based convolutional neural network to generate canonical data structures constructed according to a standardized data schema, in accordance with one or more embodiments of the present disclosure. In some embodiments, the character-based convolutional neural network 900A can be implemented in the machine learning standardization engine 125 (FIG. 1). The character-based convolutional neural network 900A can be generated by executing a hyperparameter search and selecting the best performing network based on cross-validation.

In some embodiments, the character-based convolutional neural network 900A can have an input layer 901, that receives one or more features of the input data including features extracted form headers, and rows or records. The embedding layer 903 can be configured to have 39 embedding dimensions. Convolution layers 905, 909, and 913 execute computational tasks based on convolution functions. Convolution layers, 905, 909, and 913 can generate a convolution kernel that convolved with an input layer over a single spatial (or temporal) dimension to produce output values. In the character-based convolutional neural network 900A the convolution layer 905 can be configured to a have filter size of 256, convolution layer 909 can be configured to have a filter size of 650, and convolution layer 913 can be configured to have a filter size of 256. The filter size refers to filters to be applied in the convolution functions. It is understood that other filter sizes or bias values can be equally configured.

In some embodiments, max pooling layers 907, 911, and 915 can execute a sample-based discretization process. Max pooling layers 907, 911, and 915 can down-sample input representations, and reduce inputs dimensionality. Max pooling layers 907, 911, and 915 can extract the most salient elements from an output of a convolutional layer e.g., 905, 909, and 913. In some instances, max pooling layers 907, 911, and 915 can reduce the size of inputs by removing unnecessary information for optimal computation performance.

In some embodiments, the flatten layers 917 can convert the data received from the max pooling layer 915 into a single, one dimensional vector and then, send such vector to the dense layer 919. At the dense layers 919, 923, and 927 the results of the convolutional layers are fed through one or more neural layers to generate column classifications 929. In some implementations, the dropout layer 925 can be used to randomly drop out outputs of the previous layer (or equivalently, the inputs to the subsequent layer) according to a specified dropout probability. In some implementations, a softmax dense layer 927 can be used to generate column classifications at 929. In some implementations, a cross-entropy loss function can be used to evaluate the performance and/or update the parameters of the character-based convolutional neural network 900A.

FIG. 9B illustrates another example of a character-based convolutional neural network to generate canonical data structures constructed according to a standardized data schema, in accordance with one or more embodiments of the present disclosure. In some embodiments, the character-based convolutional neural network 900B can be implemented in the machine learning standardization engine 125 (FIG. 1). Like the character-based convolutional neural network shown 900A, the character-based convolutional neural network 900B can be generated by executing a hyperparameter search and selecting the best performing network based on a 5-fold cross-validation.

In some embodiments, the character-based convolutional neural network 900B can have an input layer 931, that receives one or more features of the input data including features extracted form headers, and rows or records. In some embodiments, embedding layer 933 can be structurally and functionally analogous to embedding layer 903 shown in FIG. 9A. Embedding dimensions of embedding layer 903 and embedding layer 933 may be configured differently.

In some embodiments, convolutional layer 935 can be structurally and functionally analogous to convolutional layers 905, 909, and 913 shown in FIG. 9A. Kernel size, bias, and other parameters may be different between convolutional layers 905, 909, 913 and convolutional layer 935.

In some embodiments max pooling layer 937 can be structurally and functionally analogous to max pooling layers 907, 911, and 915 shown in FIG. 9A. Configurations of max pooling layers 907, 911, 915 and max pooling layer 937 may be different.

In some embodiments, the character-based convolutional neural network 900B can include a batch normalization layer 939. The batch normalization layer 939 can reduce the amount that hidden unit values shift around, i.e., covariance shift.

In some embodiments, the character-based convolutional neural network 900B can include an activation layer 941. The activation layer 941 can be used, for example, to increase non-linearity of the network 900B without affecting receptive fields of convolutional layers, some example of activation functions can include, without limitation, Rectified Linear Unit, sigmoid function, softmax function, Tanh function or other suitable types of activation functions.

In some embodiments, dropout layer 943 can be structurally and functionally analogous to dropout layers 921 and 925 shown in FIG. 9A. Parameters of dropout layers 921, 925, and 943 may be configured differently.

In some embodiments, the character-based convolutional neural network 900B can include additional convolutional layers, max pooling layers, batch normalization layers, activation layers, and dropout layers (not shown in FIG. 9B) with different parameters arranged in similar order as layers 935, 937, 939, 941, and 943.

In some embodiments, the character based convolutional neural network 900B can include a global average pooling layer 946 used to minimize overfitting of the network by reducing the total number of parameters in the network. In some implementations, a softmax dense layer 947 can be used to generate column classifications 949. In some implementations, a cross-entropy loss function can be used to evaluate the performance and/or update the parameters of the character-based convolutional neural network.

In some embodiments, the character-based convolutional neural networks 900A and 900B can receive an input size of 4352 characters or other suitable input size value. Such an input size value can correspond to the maximum number of characters included in the training data when, for example, 20 rows are included for each input column. In some embodiments, the number of rows in an input file or document may vary thus, in some instances padding and truncation models can be used to fit shorter or longer samples.

Figure 10:
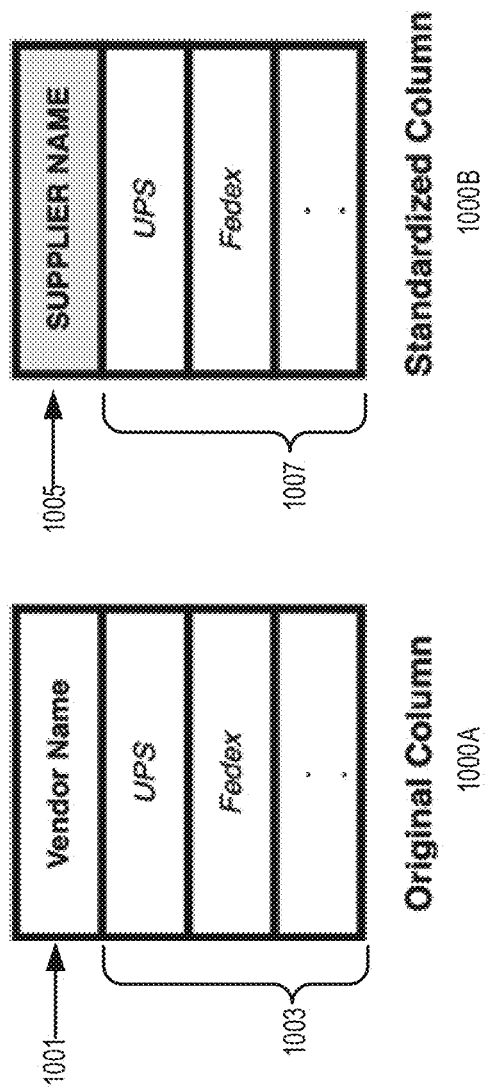

FIG. 10 illustrates an example of a canonical data structure constructed according to a standardized data schema, in accordance with one or more embodiments of the present disclosure. Data structures 1000A and 1000B are an example of two heterogenous data structures. Data structure 1000A includes a header or data classification label 1001 corresponding to "Vendor Name" associated with a set of records 1003. The column classifier 509 discussed above with respect to FIG. 5 can generate a canonical data structure constructed according to a standardized data schema shown at 1000B. The canonical data structure 1000B includes a header or data classification label "Supplier Name" 1005, such a header or data classification label can be named according to the standardized data schema. The header or data classification label can be associated with a set or records 1007.

Figure 11:
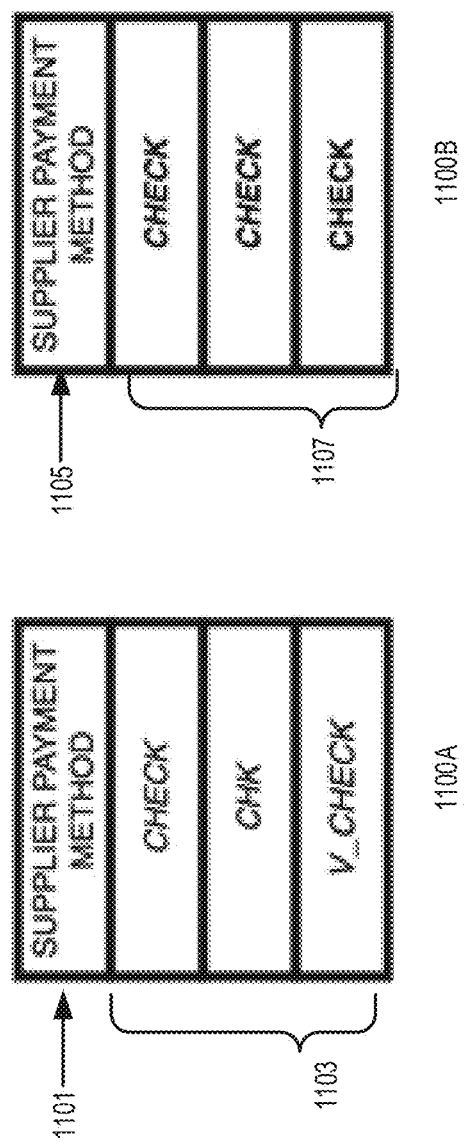

FIG. 11 illustrates an example of a canonical data structures constructed according to a standardized data schema, in accordance with one or more embodiments of the present disclosure. In some instances, canonical data structures constructed by the character classifier 509 can be further processed to convert records to the standardized data schema. For instance, the data structures 1100A and 1100B include a header or data classification label 1101 and 1105 named "Supplier Payment Method." However, the records 1103 are not formatted in the standardized data schema. In this case the data values or records 1103 can be transformed to data values constructed according to the standardized data schema as shown as shown at 1107. Such transformation can be done by, for example, a one to one mapping operation that takes as input records 1103 and produces records 1107.

Figure 12:
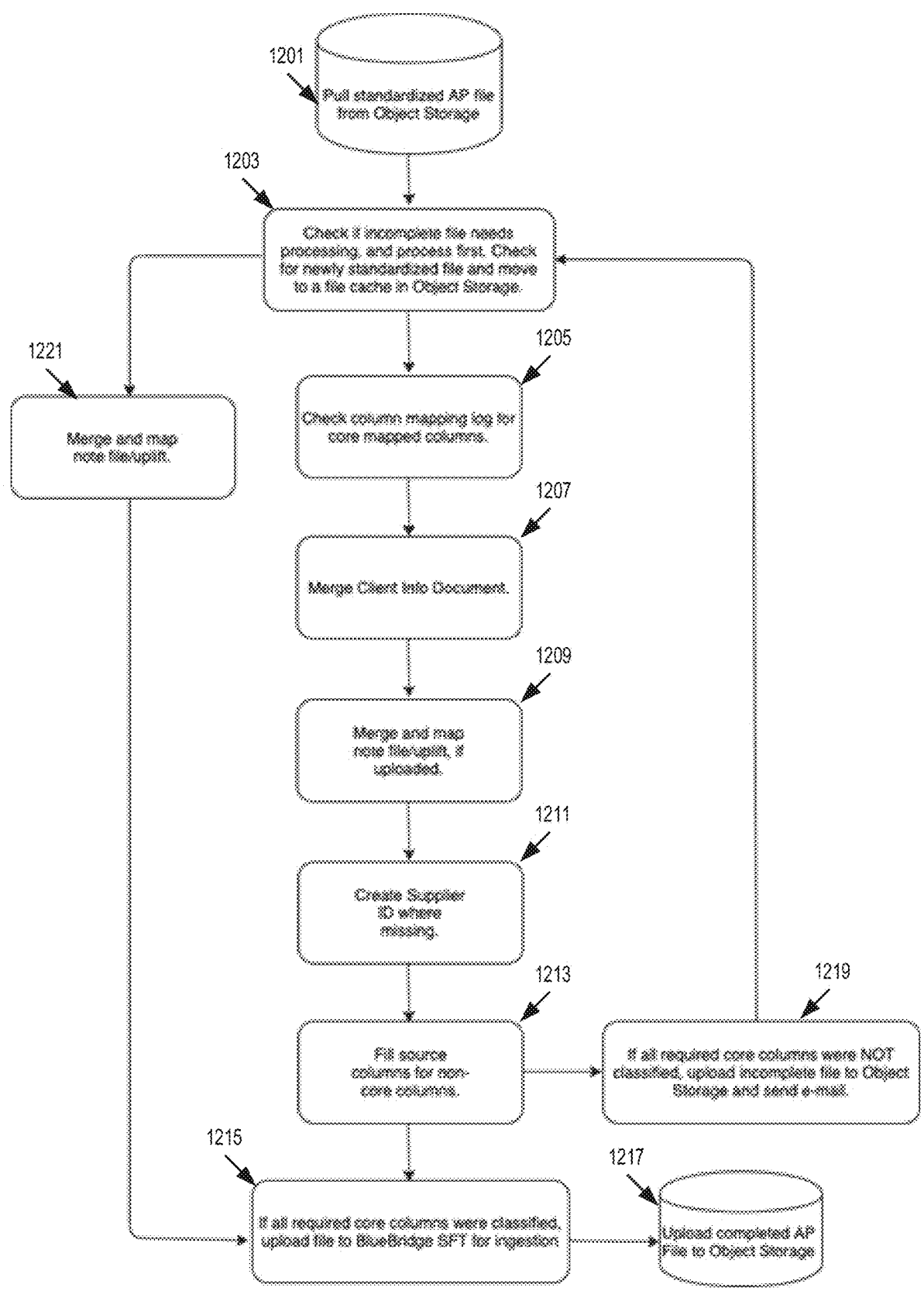

FIG. 12 illustrates an example of computations executed by the post-processor, in accordance with one or more embodiments of the present disclosure. As discussed above, post-processor 127 (FIG. 1) can execute multiple operations on data processed by the machine learning standardization engine 125 (FIG. 1) to ensure that canonical data structure constructed according to the standardized data schema are properly generated. In some instances, the post-processor can retrieve one or more files or documents with canonical data structures from a database at 1201. The post-processor can verify if any incomplete file or document requires further processing as shown at 1203. In some instances, the post-processor 127 can verify that columns are properly mapped to targeted columns as shown at 1205. In some instances, the post-processor 127 can merge further information into output files or documents containing canonical data structures, for example, client information or other entity information related to the canonical data structures as shown at 1207. In some instances, notes or other suitable information can be uploaded to the file or document containing the data canonical data structures as shown at 1209 and 1221. In some instances, the post-processor 127 can fill information not included in the canonical data structures, files, or documents, for example, supplier identification number, customer identification number, or other suitable information as shown at 1211.

In some embodiments, the post-processor 127 can fill out columns from canonical data structures with values or other data extracted from original data structures, i.e., data structures used to generate canonical data structures as shown at 1213. In some instances, when canonical data structures do not include columns that required to be constructed according to the standardized data schema (core columns), an email can be sent to, for example, a system administrator to notify her about incompleteness as shown at 1219. In some instances when all the required columns have been successfully converted in the generated canonical data structures, then the file or document containing such canonical data structures can be uploaded to other software applications or data services as shown at 1215. Thereafter, the file or document containing the canonical data structures can be uploaded to a database (e.g., database 103 shown in FIG. 1).

FIG. 13 illustrates an example of different headers or classification labels corresponding to a same classification label in a standardized data schema, in accordance with one or more embodiments of the present disclosure. Table 1300 illustrates headers or classification labels assigned to columns by different software applications. Such headers or classification labels are associated with columns containing a same type of records. All the headers or classification labels shown in table 1300 are equivalent to "Supplier Name" in the standardized data schema. As discussed above, system 100 can identify such headers or classification labels and generate canonical data structures constructed according to the standardized data schema.

FIG. 14 illustrates an output table showing performance examples of the system 100, in accordance with one or more embodiments of the present disclosure. Table 1400 shows performance examples of system 100. Table 1400 includes client names 1401, tracking numbers 1403, file types 1405, record counts 1407, pre-processor time 1409, and post-processor time 1411. Record counts correspond to the input size of the system 100, the difference between pre-processor time 1409 and post-processor time 1411 illustrate the performance time of system 100.

Figure 15:
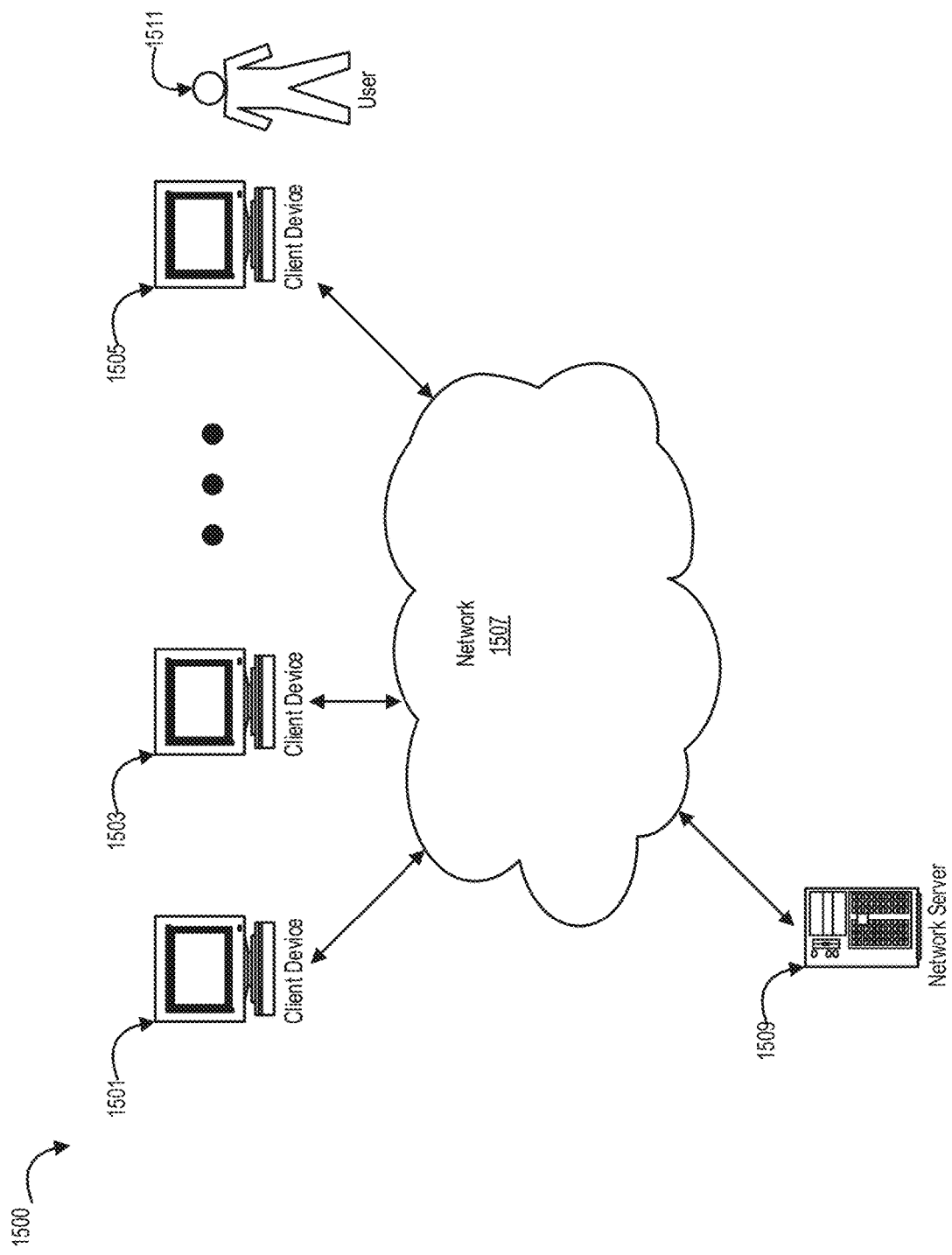

FIG. 15 depicts a block diagram of an example of a computer-based system 1500, in accordance with one or more embodiments of the present disclosure. However, not all these components may be required to practice one or more embodiments, and variations in the arrangement and type of the components may be made without departing from the spirit or scope of various embodiments of the present disclosure. In some embodiments, the computing devices and/or the computing components of the computer-based system 1500 may be configured to manage large numbers of computing devices and/or generation of canonical data structures, as detailed herein. In some embodiments, the computer-based system 1500 may be based on a scalable computer and/or network architecture that incorporates various strategies for assessing the data, caching, searching, and/or database connection pooling. An example of the scalable architecture is an architecture that is capable of operating multiple servers.

In some embodiments, computing devices 1501, 1503, and 1505 (e.g., clients) of the computer-based system 1500 may include virtually any computing device capable of receiving and sending a message over a network (e.g., cloud network), such as network 1507, to and from another computing device, such as server 1509, and the like. In some embodiments the large-scale standardization system 100 (discussed with reference to FIG. 1) can be implemented in the network server 1509. In some instances, a user 1511 in communication with client device 1505 can enter inputs and receive outputs from the network server 1509 via network 1507. In some embodiments, the computing devices 1501, 1503, and 1505 may be personal computers, multiprocessor systems, microprocessor-based or programmable consumer electronics, network PCs, and the like. In some embodiments, one or more computing devices 1501, 1503, and 1505 may include computing devices that typically connect using a wireless communications medium such as cell phones, smart phones, radio frequency (RF) devices, infrared (IR) devices, CBs, integrated devices combining one or more of the preceding devices, or virtually any mobile computing device, and the like. In some embodiments, one or more computing devices 1501, 1503, and 1505 may be devices that can connect using a wired or wireless communication medium, such as a wearable computer, laptop, tablet, desktop computer, netbook, video game device, pager, smartphone, ultra-mobile personal computer (UMPC), and/or any other device that is equipped to communicate over a wired and/or wireless communication medium. In some embodiments, computing devices 1501, 1503, and 1505 may run one or more applications, such as Internet browsers, mobile applications, voice calls, video games, videoconferencing, and email, among others. In some embodiments, computing devices 1501, 1503, and 1505 may be configured to receive and to send web pages, and the like. In some embodiments, a browser application of the present disclosure may be configured to receive and display graphics, text, multimedia, and the like, employing virtually any web based language including, but not limited to, Standard Generalized Markup Language (SGML), such as HyperText Markup Language (HTML), a wireless application protocol (WAP), a Handheld Device Markup Language (HDML), such as Wireless Markup Language (WML), WMLScript, XML, JavaScript, and the like. In some embodiments, computing devices 1501, 1503, and 1505 may be specifically programmed by either Java, .Net, QT, C, C++ and/or other suitable programming language. In some embodiments, computing devices 1501, 1503, and 1505 may be specifically programmed to include or execute an application to perform a variety of possible tasks, such as, without limitation, messaging functionality, browsing, searching, streaming or displaying various forms of content, including locally stored or uploaded messages, images and/or video.

In some embodiments, the network 1507 may provide network access, data transport and/or other services to any computing device coupled to it. In some embodiments, the network 1507 may include and implement at least one specialized network architecture that may be based at least in part on one or more standards set by, for example, without limitation, Global System for Mobile Communications (GSM) Association, the Internet Engineering Task Force (IETF), and the Worldwide Interoperability for Microwave Access (WiMAX) forum. In some embodiments, the network 1507 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the network 1507 may include and implement, as an alternative or in conjunction with one or more of the above, a WiMAX architecture defined by the WiMAX forum. In some embodiments and, optionally, in combination with any embodiment described above or below, the network 1507 may also include, for instance, at least one of a LAN, a WAN, the Internet, a virtual LAN (VLAN), an enterprise LAN, a layer 3 virtual private network (VPN), an enterprise IP network, or any combination thereof. In some embodiments and, optionally, in combination with any embodiment described above or below, at least one computer network communication over the network 1507 may be transmitted based at least, in part, on one or more communication modes such as, but not limited to: Narrow Band Internet of Things (NBIOT), ZigBee, 3G, 4G, 5G, Global System for Mobile Communications (GSM), General Packet Radio Service (GPRS), WiFi, WiMax, Code Division Multi-access (CDMA), and any combination thereof. In some embodiments, the network 1507 may also include mass storage, such as Network Attached Storage (NAS), a Storage Area Network (SAN), a Content Delivery Network (CDN) or other forms of computer or machine-readable media.

In some embodiments, the server 1509 may be, for example, a web server (or a series of servers) running a network operating system. In some embodiments, the server 1509 may be used for and/or provide cloud and/or network computing. Although not shown in FIG. 15, in some embodiments, the server 1509 may have connections to external systems like email, SMS messaging, text messaging, ad content providers, etc.

In some embodiments, the server 1509 may be specifically programmed to perform, in a non-limiting example, as authentication servers, search servers, email servers, social networking services servers, financial/banking-related services servers, travel services servers, or any similarly suitable service-based servers for users of computing devices 1501, 1503, and 1505.

In some embodiments and, optionally, in combination of any embodiment described above or below, for example, one or more computing member devices 1501, 1503, and 1505, the server 1509, may include a specifically programmed software module that may be configured to send, process, and receive information using a scripting language, a remote procedure call, an email, Short Message Service (SMS), Multimedia Message Service (MMS), Instant Messaging (IM), Internet Relay Chat (IRC), mIRC, Jabber, an application programming interface, Simple Object Access Protocol (SOAP) methods, Common Object Request Broker Architecture (CORBA), Hypertext Transfer Protocol (HTTP), Representational State Transfer (REST), or any combination thereof.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In some embodiments, programmed computing systems with associated devices can be configured to operate in the distributed network environment, communicating with one another over one or more suitable data communication networks (e.g., the Internet) and utilizing one or more suitable data communication protocols.

In some embodiments, the material disclosed herein may be implemented in hardware and software or firmware or a combination of them or as instructions stored on a non-transitory machine-readable medium, which may be read and executed by one or more processors. A machine-readable medium may include any medium and/or mechanism for storing or transmitting information in a form readable by a machine (e.g., a computing device). For example, a machine-readable medium may include ROM; RAM; magnetic disk storage media; optical storage media; flash memory devices, and others. In some embodiments, the non-transitory machine-readable medium can include one or more storage devices, and memory devices described above.

Examples of hardware elements may include processors, microprocessors, circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or Central Processing Unit (CPU). In various implementations, the one or more processors may be dual-core processor(s), dual-core mobile processor(s), and so forth.

Computer systems, and systems, as used herein, can include any combination of hardware and software. Examples of software may include software components, programs, applications, operating system software, firmware, software modules, routines, subroutines, functions, methods, procedures, software interfaces, Application Programming Interfaces (API), computer code, data, data variables, or any combination thereof that can be processed by a computing device as computer-executable instructions.

In some embodiments, one or more of computer-based systems of the present disclosure may include or be incorporated, partially or entirely into at least one Personal Computer (PC), laptop computer, tablet, portable computer, smart device (e.g., smart phone, smart tablet or smart television), Mobile Internet Device (MID), messaging device, data communication device, server computer, and so forth.

In some embodiments, computer-based systems of the present disclosure may be configured to utilize hardwired circuitry and/or hardware components that may be used in place of or in combination with software instructions to implement latent features extraction consistent with principles of the disclosure. Thus, implementations consistent with principles of the disclosure are not limited to any specific combination of hardware circuitry or hardware components and/or software.

In some embodiments, software specifically programmed in accordance with one or more principles of the present disclosure may also be available as a client-server software application, or as a web-enabled software application. For example, software specifically programmed in accordance with one or more principles of the present disclosure may also be embodied as a software package installed on a hardware device.

In some embodiments, computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000. As used herein, the term "user" shall have a meaning of at least one user.

The aforementioned examples are, of course, illustrative and not restrictive.

At least some aspects of the present disclosure will now be described with reference to the following numbered clauses.

1. A computer-based system, comprising:
a processor; and
a non-transitory memory storing instructions which, when executed by the processor, causes the processor to:
receive a set of documents, each document of the set of documents comprises a plurality of records constructed from a plurality of data elements formatted according to at least one data schema;
utilize a first machine learning model to select a document from the set of documents based on the plurality of records comprised in the document;
utilize a second machine learning model to select a set of data elements from the plurality of data elements comprised in the document,
wherein each data element from the set of data elements comprises a distinct data classification label formatted according to a first data schema from the at least one data schema,
wherein each data classification label is associated with a set of records from the plurality of records comprised in the document, and
wherein each record of the set of records is formatted according to the first data schema; and
utilize a third machine learning model to generate a canonical data structure constructed according to a second data schema based on:
(i) each data classification label associated with each data element from the set of data elements and
(ii) the set of records associated with each data classification label.

2. The computer-based system of clause 1, wherein the instructions further causes the
processor to:
receive the set of documents from a plurality of software applications, wherein the plurality of records comprised in each document is formatted according to a data schema associated with a software application from the plurality of software applications.

3. The computer-based system of clauses 1-2, wherein the first machine learning model is a trained decision tree model.

4. The computer-based system of clauses 1-3, wherein the second machine learning model is a logistic regression machine learning model.

5. The computer-based system of clauses 1-4, wherein the third machine learning model is a convolutional neural network.

6 The computer-based system of clauses 1-5, wherein the canonical data structure comprises a data classification label and a set of records formatted according to the second data schema.

7. The computer-based system of clauses 1-6, wherein the document from the set of documents is a work spreadsheet.

8. A method, comprising:
receiving, by a computer-based system, a set of documents, each document of the set of documents comprises a plurality of records constructed from a plurality of data elements formatted according to at least one data schema;

utilizing, by the computer-based system, a first machine learning model to select a document from the set of documents based on the plurality of records comprised in the document;

utilizing, by the computer-based system, a second machine learning model to select a set of data elements from the plurality of data elements comprised in the document, wherein each data element from the set of data elements comprises a distinct data classification label formatted according to a first data schema from the at least one data schema, wherein each data classification label is associated with a set of records from the plurality of records comprised in the document, and wherein each record of the set of records is formatted according to the first data schema; and utilizing, by the computer-based system, a third machine learning model to generate a canonical data structure constructed according to a second data schema based on:

(i) each data classification label associated with each data element from the set of data elements and (ii) the set of records associated with each data classification label.

9. The method of clause 8, further comprising:

receiving, by the computer-based system, the set of documents from a plurality of software applications, wherein the plurality of records comprised in each document is formatted to a data schema associated with a software application from the plurality of software applications.

10. The method of clauses 8-9, wherein the first machine learning model is a trained decision tree model.

11. The method of clauses 8-10, wherein second machine learning model is a logistic regression machine learning model.

12. The method of clauses 8-11, wherein the third machine learning model is a convolutional neural network.

13. The method of clauses 8-12, wherein the canonical data structure comprises a data classification label and a set of records formatted according to the second data schema.

14. The method of clauses 8-13, wherein the document from the set of documents is a work spreadsheet.

15. A non-transitory computer-readable medium comprising instructions which, when executed by a processor, cause the processor to:

receive a set of documents, each document of the set of documents comprises a plurality of records constructed from a plurality of data elements formatted according to at least one data schema;

utilize a first machine learning model to select a document from the set of documents based on the plurality of records comprised in the document;

utilize a second machine learning model to select a set of data elements from the plurality of data elements comprised in the document, wherein each data element from the set of data elements comprises a distinct data classification label formatted according to a first data schema from the at least one data schema, wherein each data classification label is associated with a set of records from the plurality of records comprised in the document, and wherein each record of the set of records is formatted according to the first data schema; and utilize a third machine learning model to generate a canonical data structure constructed according to a second data schema based on:

(i) each data classification label associated with each data element from the set of data elements and (ii) the set of records associated with each data classification label.

16. The non-transitory computer-readable medium of clause 15, wherein the instructions further causes the processor to:

receive the set of documents from a plurality of software applications, wherein the plurality of records comprised in each document is formatted to a data schema associated with a software application from the plurality of software applications.

17. The non-transitory computer-readable medium of clauses 15-16, wherein the first machine learning model is a trained decision tree model.

18. The non-transitory computer-readable medium of clauses 15-17, wherein second machine learning model is a logistic regression machine learning model.

19. The non-transitory computer-readable medium of clauses 15-18, wherein the third machine learning model is a convolutional neural network.

20. The non-transitory computer-readable medium of clauses 15-19, wherein the canonical data structure comprises a data classification label and a set of records formatted according to the second data schema.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the methodologies, the systems, and the devices described herein can be utilized in any combination with each other. Further still, the various steps may be carried out in any desired order (and any desired steps may be added and/or any desired steps may be eliminated).

The invention claimed is:

1. A computer-based system, comprising:

a processor; and a non-transitory memory storing instructions that, when executed by the processor, configure the processor to:

train a first machine learning model using a first data set to identify differences in documents;

train a second machine learning model using a second data set to identify differences in data elements;

train a third machine learning model using a third data set to generate canonical data structures for different types of data;

receive a set of documents, each document of the set of documents comprising a plurality of records constructed from a plurality of data elements formatted according to at least one data schema;

utilize the first machine learning model to select a document from the set of documents based on the plurality of records comprised in the document, wherein the first machine learning model is a random forests model;

utilize the second machine learning model to select a set of data elements from the plurality of data elements comprised in the document, wherein each data element from the set of data elements comprises a distinct data classification label formatted according to a first data schema from the at least one data schema, wherein each data classification label is associated with a target type of data for a set of records from the plurality of records comprised in the document, and wherein each record of the set of records is formatted according to the first data schema; and utilize the third machine learning model to generate a canonical data structure for the target type of data constructed according to a second data schema associated with the target type of data based on:
(i) each data classification label associated with each data element from the set of data elements, and
(ii) the set of records associated with each data classification label;

wherein at least one of the canonical data structures is corrected; and wherein the at least one of the corrected canonical data structures retrains at least one of the first machine learning model or the second machine learning model.

2. The computer-based system of claim 1, wherein the processor is further configured to:

receive the set of documents from a plurality of software applications, wherein the plurality of records in each document is formatted according to a data schema associated with a software application from the plurality of software applications.

3. The computer-based system of claim 1, wherein the second machine learning model is a logistic regression machine learning model.

4. The computer-based system of claim 1, wherein the third machine learning model is a convolutional neural network.

5. The computer-based system of claim 1, wherein the canonical data structure comprises:

a data classification label and a set of records formatted according to the second data schema.

6. The computer-based system of claim 1, wherein the document from the set of documents is a spreadsheet.

7. A method, comprising:

training, by a computer-based system, a first machine learning model using a first data set to identify differences in documents;

training a second machine learning model using a second data set to identify differences in data elements;

training a third machine learning model using a third data set to generate canonical data structures for different types of data;

receiving a set of documents, each document of the set of documents comprising a plurality of records constructed from a plurality of data elements formatted according to at least one data schema;

utilizing the first machine learning model to select a document from the set of documents based on the plurality of records comprised in the document, wherein the first machine learning model is a random forests model;

utilizing the second machine learning model to select a set of data elements from the plurality of data elements comprised in the document, wherein each data element from the set of data elements comprises a distinct data classification label formatted according to a first data schema from the at least one data schema, wherein each data classification label is associated with a target type of data for a set of records from the plurality of records comprised in the document, and wherein each record of the set of records is formatted according to the first data schema; and utilizing the third machine learning model to generate a canonical data structure for the target type of data constructed according to a second data schema associated with the target type of data based on:
(i) each data classification label associated with each data element from the set of data elements, and
(ii) the set of records associated with each data classification label wherein at least one of the canonical data structures is corrected; and wherein the at least one of the corrected canonical data structures retrains at least one of the first machine learning model or the second machine learning model.

8. The method of claim 7, further comprising:

receiving, by the computer-based system, the set of documents from a plurality of software applications, wherein the plurality of records in each document is formatted to a data schema associated with a software application from the plurality of software applications.

9. The method of claim 7, wherein the second machine learning model is a logistic regression machine learning model.

10. The method of claim 7, wherein the third machine learning model is a convolutional neural network.

11. The method of claim 7, wherein the canonical data structure comprises a data classification label and a set of records formatted according to the second data schema.

12. The method of claim 7, wherein the document from the set of documents is a spreadsheet.

13. A non-transitory computer-readable medium comprising instructions that, when executed by a processor, cause the processor to:

train a first machine learning model using a first data set to identify differences in documents;

train a second machine learning model using a second data set to identify differences in data elements;

train a third machine learning model using a third data set to generate canonical data structures for different types of data;

receive a set of documents, each document of the set of documents comprising a plurality of records constructed from a plurality of data elements formatted according to at least one data utilize the first machine learning model to select a document from the set of documents based on the plurality of records comprised in the document, wherein the first machine learning model is a random forests model;

utilize the second machine learning model to select a set of data elements from the plurality of data elements comprised in the document, wherein each data element from the set of data elements comprises a distinct data classification label formatted according to a first data schema from the at least one data schema, wherein each data classification label is associated with a target type of data for a set of records from the plurality of records comprised in the document, and wherein each record of the set of records is formatted according to the first data schema; and utilize the third machine learning model to generate a canonical data structure for the target type of data constructed according to a second data schema associated with the target type of data based on:
- (i) each data classification label associated with each data element from the set of data elements, and
- (ii) the set of records associated with each data classification label wherein at least one of the canonical data structures is corrected; and wherein the at least one of the corrected canonical data structures retrains at least one of the first machine learning model or the second machine learning model.

14. The non-transitory computer-readable medium of claim 13, wherein the instructions further cause the processor to:

receive the set of documents from a plurality of software applications, wherein the plurality of records in each document is formatted to a data schema associated with a software application from the plurality of software applications.

15. The non-transitory computer-readable medium of claim 13, wherein the second machine learning model is a logistic regression machine learning model.

16. The non-transitory computer-readable medium of claim 13, wherein the third machine learning model is a convolutional neural network.

17. The non-transitory computer-readable medium of claim 13, wherein the canonical data structure comprises:

a data classification label and a set of records formatted according to the second data schema.

* * * * *